(12) United States Patent
Terashima

(10) Patent No.: US 11,262,456 B2
(45) Date of Patent: Mar. 1, 2022

(54) POSITIONING SYSTEM, PSEUDO STATION CONTROL DEVICE, AND METHOD OF CONTROLLING PSEUDO SATELLITE STATION

(71) Applicant: SEIKO EPSON CORPORATION, Tokyo (JP)

(72) Inventor: Maho Terashima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 258 days.

(21) Appl. No.: 16/575,892

(22) Filed: Sep. 19, 2019

(65) Prior Publication Data

US 2020/0096644 A1 Mar. 26, 2020

(30) Foreign Application Priority Data

Sep. 20, 2018 (JP) .............................. JP2018-176196

(51) Int. Cl.
*G01S 19/11* (2010.01)
*H04B 7/185* (2006.01)
*G01S 19/37* (2010.01)
*G01S 19/23* (2010.01)
*G01S 19/39* (2010.01)

(52) U.S. Cl.
CPC ............. *G01S 19/115* (2019.08); *G01S 19/23* (2013.01); *G01S 19/37* (2013.01); *G01S 19/396* (2019.08); *H04B 7/18523* (2013.01)

(58) Field of Classification Search
CPC ...... G01S 19/07; G01S 19/115; G01S 19/396; G01S 19/23; G01S 19/37; G01S 19/41; G01S 19/44; G01S 19/48; G01S 5/0027; G01S 19/11; H04B 7/18523
USPC .......................................................... 342/357.31
See application file for complete search history.

(56) References Cited

U.S. PATENT DOCUMENTS

| 5,959,575 A | * | 9/1999 | Abbott | G01C 21/00 342/357.31 |
| 6,813,500 B1 | * | 11/2004 | Ciganer | G01S 19/46 455/456.1 |
| 8,035,556 B2 | | 10/2011 | Lee et al. | |
| 2006/0262014 A1 | * | 11/2006 | Shemesh | G01S 19/11 342/386 |
| 2012/0086599 A1 | * | 4/2012 | Mo | G01S 19/11 342/357.31 |

(Continued)

FOREIGN PATENT DOCUMENTS

JP 2011-039062 A 2/2011

*Primary Examiner* — Harry K Liu
(74) *Attorney, Agent, or Firm* — Oliff PLC

(57) ABSTRACT

A positioning system including a satellite signal receiver 20 that receives satellite signals from a plurality of positioning satellites; a plurality of indoor pseudo satellite stations that transmit pseudo satellite signals; and a pseudo station control device that selects the positioning satellites to be allocated to the plurality of pseudo satellite stations based on the received satellite signals, allocates a PRN code corresponding to each of the selected positioning satellites to each of the plurality of pseudo satellite stations one by one, determines a delay time of the PRN code allocated to the plurality of pseudo satellite stations, and transmits a plurality of pseudo satellite signals generated using the PRN code corresponding to each of the plurality of pseudo satellite stations and the delay time to each of the plurality of pseudo satellite stations.

10 Claims, 5 Drawing Sheets

(56) References Cited

U.S. PATENT DOCUMENTS

| | | | |
|---|---|---|---|
| 2013/0093619 A1* | 4/2013 | Joo | G01S 5/08 |
| | | | 342/357.48 |
| 2013/0279543 A1* | 10/2013 | Torimoto | G01S 19/48 |
| | | | 375/146 |
| 2015/0133171 A1* | 5/2015 | Bani Hani | H04W 4/029 |
| | | | 455/456.6 |

* cited by examiner

POSITIONING SYSTEM, PSEUDO STATION CONTROL DEVICE, AND METHOD OF CONTROLLING PSEUDO SATELLITE STATION

The present application is based on, and claims priority from JP Application Serial Number 2018-176196, filed Sep. 20, 2018, the disclosure of which is hereby incorporated by reference herein in its entirety.

BACKGROUND

1. Technical Field

The present disclosure relates to a positioning system, a pseudo station control device, and a method of controlling a pseudo satellite station.

2. Related Art

In the related art, a positioning system has been used which can use, for example, a global positioning system (GPS) satellite as a positioning satellite, and receive satellite signals from the GPS satellite by a GPS receiver to determine a position of a user. In such a positioning system, since the satellite signals have to be received from the GPS satellite, when the GPS receiver is indoors, in a tunnel, or the like, the satellite signals cannot be received, so that the position of the user cannot be determined. To cope with such a problem, for example, in a positioning system described in JP-A-2011-039062, a pseudo satellite system has been proposed in which a plurality of pseudo satellites (pseudo stations) are disposed in an area such as indoors in which satellite signals cannot be reached, and the satellite signals are transmitted from the pseudo satellites.

However, the positioning system (pseudo satellite system) described in JP-A-2011-039062 is a system using pseudo random noise (PRN) code which is the number of the satellites different from those allocated to actual positioning satellites for the plurality of pseudo satellites (pseudo stations) disposed indoors. Therefore, there has been a problem that a positioning receiver (GPS receiver), which does not correspond to the PRN code (number of satellites) allocated to the pseudo satellite, cannot be used for the positioning system.

SUMMARY

A positioning system according to an aspect of the present disclosure includes: a satellite signal receiver that receives satellite signals from a plurality of positioning satellites; a plurality of indoor pseudo satellite stations that transmit pseudo satellite signals; and a pseudo station control device that selects the positioning satellite to be allocated to each of the plurality of pseudo satellite stations based on the received satellite signals, allocates a PRN code corresponding to each of the selected positioning satellites to each of the plurality of pseudo satellite stations one by one, determines a delay time of the PRN code allocated to the plurality of pseudo satellite stations, and transmits a plurality of pseudo satellite signals generated using the PRN code corresponding to each of the plurality of pseudo satellite stations and the delay time to each of the plurality of pseudo satellite stations.

In the positioning system, the pseudo station control device may determine the PRN code to be allocated to the pseudo satellite station based on a disposition of the plurality of positioning satellites.

In the positioning system, when a predetermined time is elapsed, the pseudo station control device may update the PRN code allocated to the pseudo satellite station.

In the positioning system, the pseudo station control device may transmit the pseudo satellite signal generated based on the delay time for the satellite signal received by the satellite signal receiver to the pseudo satellite station.

A pseudo station control device according to an aspect of the present disclosure is a pseudo station control device for controlling a plurality of indoor pseudo satellite stations that transmit pseudo satellite signals, the device including: a satellite selection section that selects positioning satellites to be allocated to the plurality of pseudo satellite stations based on satellite signals from a plurality of the positioning satellites; a PRN code imparting section that allocates a PRN code corresponding to each of the selected positioning satellites to each of the plurality of pseudo satellite stations one by one; a delay amount calculation section that determines a delay time of each of the PRN codes allocated to the plurality of pseudo satellite stations; a pseudo satellite signal generation section that generates the pseudo satellite signal using the PRN code and the corresponding delay time; and a transmission section that transmits the pseudo satellite signal to each of the plurality of corresponding pseudo satellite stations.

In the pseudo station control device, the PRN code imparting section may allocate the PRN code to the pseudo satellite station based on a disposition of the plurality of positioning satellites.

In the pseudo station control device, when a predetermined time is elapsed, the PRN code imparting section may update the PRN code allocated to the pseudo satellite station.

In the pseudo station control device, the pseudo satellite signal generation section may calculate the pseudo satellite signal processed based on the delay time for the satellite signal from the positioning satellite.

A method of controlling a pseudo satellite station according an aspect of the present disclosure includes: receiving satellite signals from a plurality of positioning satellites; selecting the positioning satellites to be allocated to a plurality of indoor pseudo satellite stations based on the received satellite signals; allocating a PRN code corresponding to each of the selected positioning satellites to each of the plurality of pseudo satellite stations one by one; determining a delay time of the PRN code allocated to the plurality of pseudo satellite stations; transmitting the pseudo satellite signal generated using the PRN code and the delay time to each of the plurality of pseudo satellite stations; and transmitting the corresponding pseudo satellite signal from each of the plurality of pseudo satellite stations.

In the method of controlling a pseudo satellite station, in the selecting, the positioning satellites to be allocated to the plurality of pseudo satellite stations may be selected based on a disposition of the plurality of positioning satellites.

In the method of controlling a pseudo satellite station, the PRN code may be updated when a predetermined time is elapsed after the PRN code is allocated to the plurality of pseudo satellite stations.

In the method of controlling a pseudo satellite station, in the transmitting of the pseudo satellite signal, the pseudo satellite signal generated based on the delay time for the satellite signal received by a satellite signal receiver may be transmitted to the pseudo satellite station.

DESCRIPTION OF EXEMPLARY EMBODIMENTS

Hereinafter, embodiments of a positioning system, a pseudo station control device, and a method of controlling a pseudo satellite station will be described with reference to the respective drawings. The embodiments described below do not unduly limit the contents of the present disclosure described in the appended claims. Further, all of the configurations described in the following embodiments are not necessarily essential configuration requirements of the present disclosure.

Figure 1:
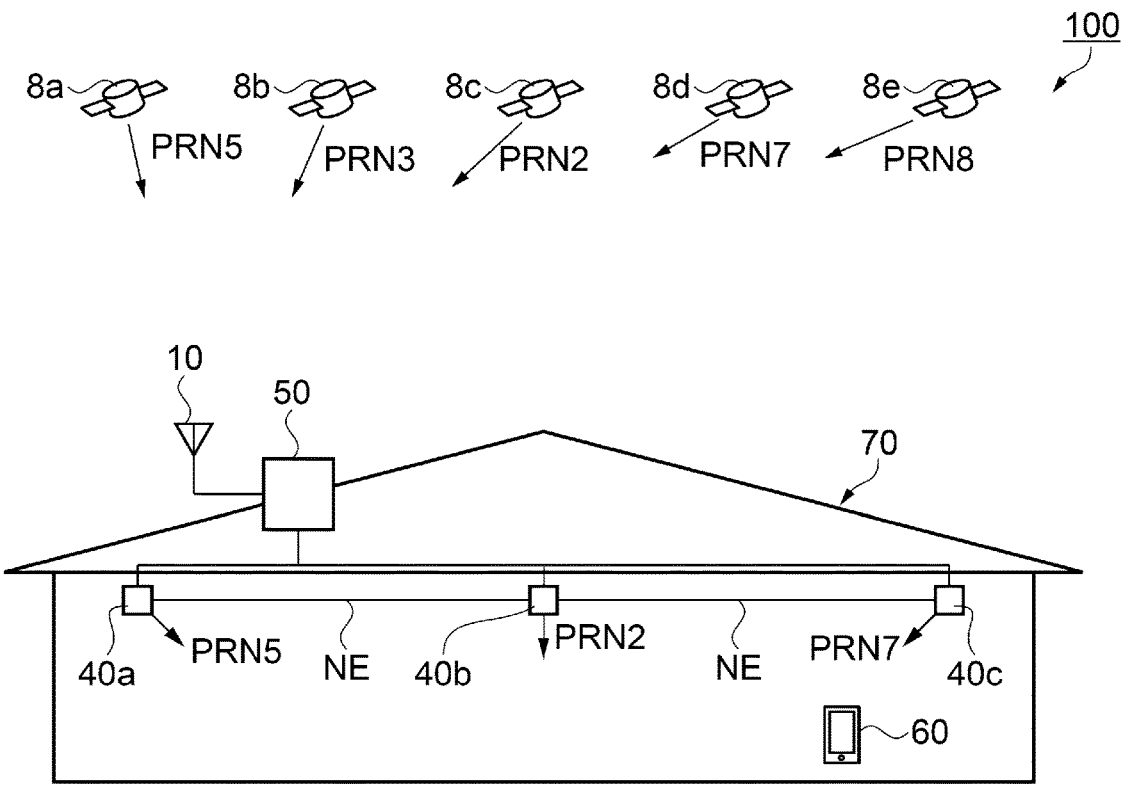
FIG. 1 is a schematic configuration view illustrating an outline of a positioning system according to an embodiment.
Figure 2:
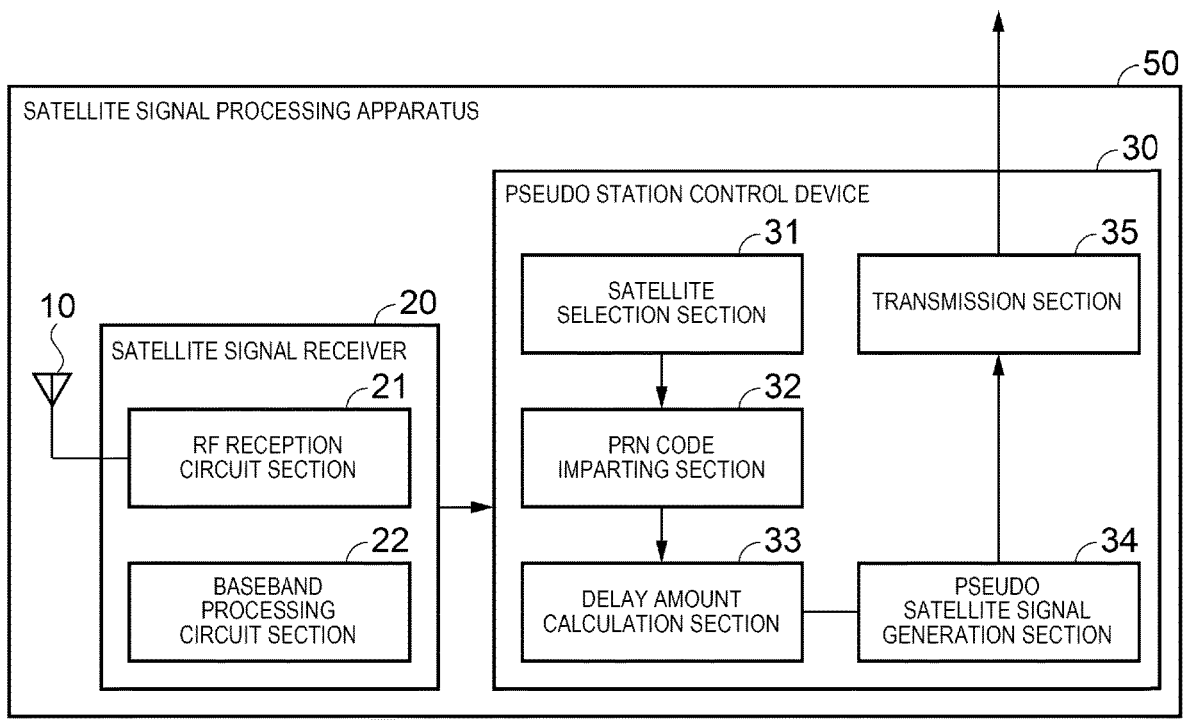
FIG. 2 is a block diagram illustrating a configuration example of a satellite signal processing apparatus constituting the positioning system.

1. Configuration of Positioning System and Satellite Signal Processing Apparatus First, a positioning system according to the embodiment and a structure of a satellite signal processing apparatus including a pseudo station control device applied thereto will be described with reference to FIGS. 1 and 2. FIG. 1 is a schematic configuration view illustrating an outline of the positioning system according to the embodiment. FIG. 2 is a block diagram illustrating a configuration example of the satellite signal processing apparatus constituting the positioning system.

A positioning system 100 illustrated in FIG. 1 can use, for example, a global positioning system (GPS). The GPS, also referred to as a global positioning system, is a satellite positioning system for measuring a current position on the earth based on satellite signals transmitted from a plurality of positioning satellites. A GPS receiver receives satellite signals as a satellite signal receiver, and has a function of performing a positioning calculation using GPS time information and orbit information to obtain position information of a user, and a function of time correction in a clock function.

The positioning system 100 includes a satellite signal processing apparatus 50 receiving satellite signals from GPS satellites 8a, 8b, 8c, 8d, and 8e as a plurality of positioning satellites (only five are illustrated in FIG. 1) by an antenna 10, and generating pseudo satellite signals, and three pseudo satellite stations 40a, 40b, and 40c transmitting pseudo satellite signals generated by the satellite signal processing apparatus 50. In the embodiment, although the configuration of the three pseudo satellite stations 40a, 40b, and 40c is illustrated, the number of pseudo satellite stations is not limited thereto, and the number of pseudo satellite stations may be set as needed.

The GPS satellites 8a, 8b, 8c, 8d, and 8e are one type of positioning satellites, and transmit navigation messages including orbit information such as almanac and ephemeris on a satellite signal which is one type of positioning signals. The satellite signal is a coarse and acquisition (C/A) code, which is a type of spreading code, and a 1.57542 [GHz] communication signal modulated by a code division multiple access (CDMA) system known as a spread spectrum system. The C/A code is a pseudo random noise code with a repetition period of 1 ms in which a code length of 1023 chips is 1 PN frame, and is a code unique to each of the GPS satellite 8a, 8b, 8c, 8d, and 8e.

The C/A code is also called a pseudo random noise (PRN) code (pseudo random code), and a different PRN code is allocated to each positioning satellite. The positioning satellites transmit satellite signals using the allocated PRN code. FIG. 1 illustrates a configuration example in which PRN 5 is allocated to the GPS satellite 8a as the PRN code, PRN 3 to the GPS satellite 8b, PRN 2 to the GPS satellite 8c, PRN 7 to the GPS satellite 8d, and PRN 8 to the GPS satellite 8e.

A plurality of pseudo satellite stations 40a, 40b, and 40c are used to support positioning by a positioning receiver 60 at a place where it is difficult to receive satellite signals. The plurality of pseudo satellite stations 40a, 40b, and 40c are installed, for example, in various facilities and buildings such as a shopping mall, an underground mall, an airport, a movie theater, and a hotel. The plurality of pseudo satellite stations 40a, 40b, and 40c and the satellite signal processing apparatus 50, or the pseudo satellite stations 40a, 40b, and 40c are connected by, for example, a network NE or a wireless communication network (not illustrated). The same PRN code as those of the GPS satellites 8a, 8c, and 8d selected and allocated from the plurality of GPS satellites 8a, 8b, 8c, 8d, and 8e is allocated to each of the plurality of pseudo satellite stations 40a, 40b, and 40c. Specifically, when positioning satellite signals from the positioning satellites indicated by the PRN5, the PRN2, and the PRN7 are received by the antenna 10, the satellite signal processing apparatus 50 allocates the PRN 5 to the pseudo satellite station 40a as the PRN code, allocates the PRN2 to the pseudo satellite station 40b as the PRN code, and allocates the PRN7 to the pseudo satellite station 40c as the PRN code. Then, the plurality of pseudo satellite stations 40a, 40b, and 40c transmit the pseudo satellite signals in the same manner as the GPS satellites 8a, 8c, and 8d using the allocated PRN codes.

The pseudo satellite signals transmitted from the pseudo satellite stations 40a, 40b and 40c are received by the positioning receiver (information processing apparatus) 60 having the same function as that generally used outdoors, and the positioning calculation can be performed. Here, the positioning receiver 60 can be configured by, for example, a smartphone, a tablet-type information terminal device, or a wearable device (list device).

As illustrated in FIG. 2, the satellite signal processing apparatus 50 includes a satellite signal receiver 20 connected to the antenna 10, and a pseudo station control device 30 for processing the satellite signal received by the satellite signal receiver 20. The satellite signal processing apparatus 50 is installed outdoors or the like where satellite signals can be received. The satellite signal receiver 20 and the pseudo station control device 30 may be configured integrally or separately.

The antenna 10 is an antenna for receiving the satellite signals transmitted from the GPS satellites 8a, 8b, 8c, 8d, and 8e. Therefore, the antenna 10 is installed outside various facilities/buildings, for example, on a place where satellite signals can be reliably received, such as a rooftop. The antenna 10 may be included in the satellite signal receiver 20 or may be configured by a plurality of antennas.

The satellite signal receiver 20 includes an RF reception circuit section 21 and a baseband processing circuit section 22. The satellite signal receiver 20 can perform processing such as acquiring a navigation message including ephemeris from a satellite signal received by the antenna 10, acquiring positioning information, or the like. When receiving the satellite signal from each of the GPS satellites 8a, 8b, 8c, 8d, and 8e, the satellite signal receiver 20 can receive (capture) the satellite signal only by changing the PRN code. The RF reception circuit section 21 and the baseband processing circuit section 22 can be respectively manufactured as separate Large Scale Integration (LSI) or can be manufactured as one chip.

The RF reception circuit section 21 is a reception circuit of an RF signal. As a circuit configuration, for example, it may be a reception circuit that converts the RF signal received by the antenna 10 into a digital signal by an A/D converter, and processes the digital signal, or it may be a configuration in which the RF signal received by the antenna 10 is processed in an analog signal as it is and finally A/D conversion is performed to output the digital signal to the baseband processing circuit section 22.

In the latter case, for example, the RF reception circuit section 21 can be configured as follows. That is, an oscillation signal for RF signal multiplication is generated by dividing or multiplying a predetermined oscillation signal. Then, the generated oscillation signal is multiplied by the RF signal output from the antenna 10 to down convert the RF signal to a signal of an intermediate frequency (hereinafter referred to as Intermediate Frequency (IF) signal) and the IF signal is amplified or the like. Thereafter, the signal is converted into a digital signal by an A/D converter and outputs to the baseband processing circuit section 22.

The baseband processing circuit section 22 performs carrier removal, correlation processing, or the like on the signal output from the RF reception circuit section 21 to acquire the signal. The success of this capture means the success of signal reception. If the capture is successful, information (data; bit values) transported to the signal is decoded.

When receiving the satellite signals from the GPS satellites 8a, 8b, 8c, 8d, and 8e, the baseband processing circuit section 22 uses the satellite signals and various ephemeris stored in a storage section (not illustrated) to calculate a position (position coordinates) and a clock error (clock bias). Then, the baseband processing circuit section 22 transmits position (position coordinates) and clock error (clock bias) information to the pseudo station control device 30.

The pseudo station control device 30 includes a satellite selection section 31, a PRN code imparting section 32, a delay amount calculation section 33, a pseudo satellite signal generation section 34, and a transmission section 35. The pseudo station control device 30 processes the received satellite signal, generates a pseudo satellite signal, and transmits the pseudo satellite signal to the pseudo satellite stations 40a, 40b, and 40c.

The pseudo station control device 30 can include a memory (not illustrated) that stores various pieces of information (for example, programs and various data) and a processor (not illustrated) that operates based on the information stored in the memory. For the processor, for example, the functions of the satellite selection section 31, the PRN code imparting section 32, the delay amount calculation section 33, the pseudo satellite signal generation section 34, and the transmission section 35 may be realized by individual hardware, or the functions of respective sections may be implemented in one piece of hardware. The processor may be, for example, a central processing unit (CPU). However, the processor is not limited to the CPU, and various processors such as a graphics processing unit (GPU) and a digital signal processor (DSP) can be used. The processor may also be a hardware circuit with an ASIC. The memory may be, for example, a semiconductor memory such as a static random access memory (SRAM) or a dynamic random access memory (DRAM).

The satellite selection section 31 selects, for example, the GPS satellites 8a, 8c, and 8d to be respectively allocated to the pseudo satellite stations 40a, 40b, and 40c based on the received satellite signals. The satellite selection section 31 can select the GPS satellites 8a, 8c, and 8d to be allocated to the pseudo satellite stations 40a, 40b, and 40c based on, for example, the geometrical disposition of a plurality of positioning satellites (for example, the GPS satellites 8a, 8b, 8c, 8d, and 8e). An example of a specific method of selecting will be described later.

The PRN code imparting section 32 allocates the PRN code (PRN5, PRN2, or PRN7) corresponding to each of the selected GPS satellites 8a, 8c, and 8d to each of the pseudo satellite stations 40a, 40b, and 40c one by one. For example, the PRN code imparting section 32 can use GPS satellites 8a, 8c, 8d selected by the satellite selection section 31 based on the geometrical disposition of the plurality of positioning satellites (for example, the GPS satellites 8a, 8b, 8c, 8d, and 8e) to determine the PRN codes. Specifically, in this example, the GPS satellite 8a (PRN code PRN5) is allocated to the pseudo satellite station 40a, the GPS satellite 8c (PRN code PRN2) is allocated to the pseudo satellite station 40b, and the GPS satellite 8d (PRN code PRN7) is allocated to the pseudo satellite station 40c.

The PRN code imparting section 32 of the pseudo station control device 30 can update the PRN codes (PRN5, PRN2, and PRN7) allocated to the pseudo satellite stations 40a, 40b, and 40c when a predetermined time set in advance is elapsed. In other words, when the predetermined time set in advance is elapsed, the PRN code imparting section 32 can select the GPS satellite again and update the PRN codes allocated to the pseudo satellite stations 40a, 40b, and 40c. In this way, the GPS satellites 8a, 8b, 8c, 8d, and 8e at positions suitable for receiving the satellite signals can be always selected to receive the satellite signals.

The delay amount calculation section 33 determines the delay time of the PRN codes (PRN5, PRN2, and PRN7) allocated to the pseudo satellite stations 40a, 40b, and 40c. This delay time can be calculated based on the coordinates of the GPS satellites 8a, 8c, and 8d, the coordinates of the antenna 10, and the coordinates of the pseudo satellite stations 40a, 40b, and 40c, as described later.

Figure 3:
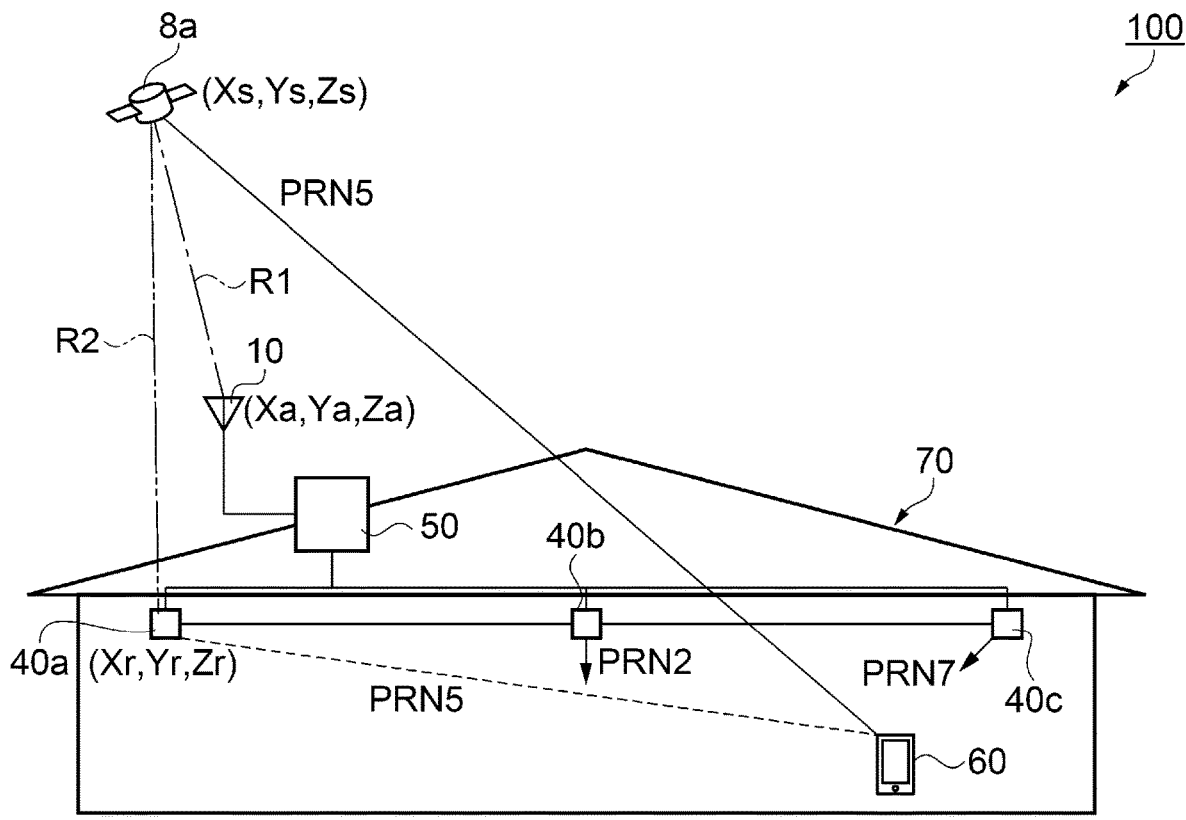
FIG. 3 is a conceptual view for explaining a delay time of a PRN code.
Figure 4:
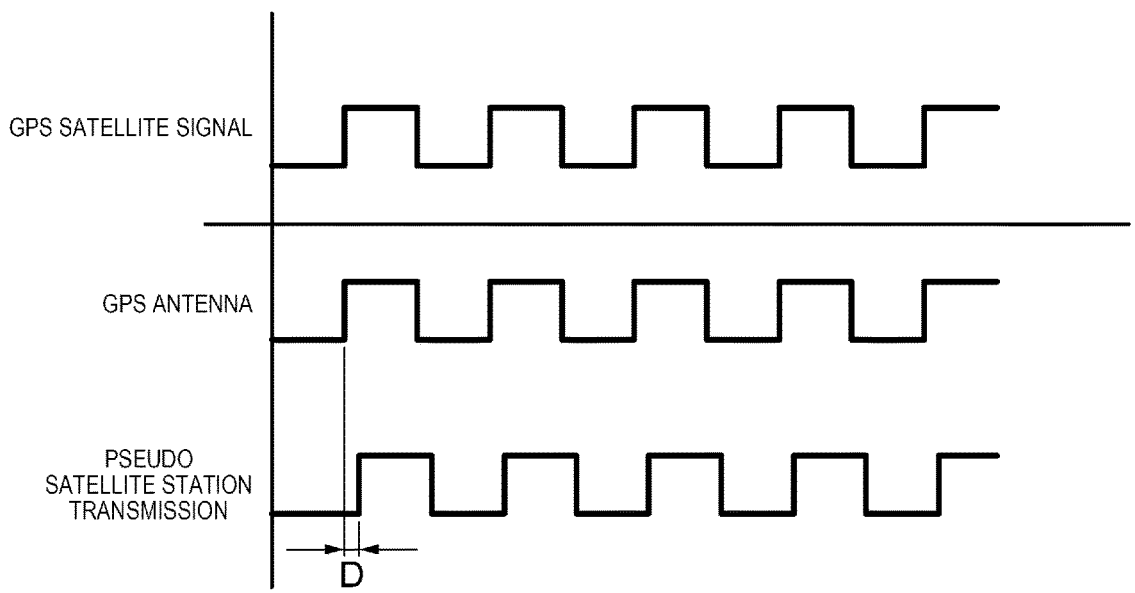
FIG. 4 is a timing chart illustrating a correlation (delay time) between a satellite signal and a pseudo satellite signal.

Here, the delay time of the PRN codes (PRN5, PRN2, and PRN7) will be described in detail with reference to FIGS. 3 and 4. FIG. 3 is a conceptual view for explaining the delay time of the PRN code. FIG. 4 is a timing chart illustrating a correlation (delay time) between a satellite signal and a pseudo satellite signal. In the following description of the delay time, the PRN code (PRN5) will be described as a representative example.

Assuming that a distance between the GPS satellite 8a and the antenna 10 is R1 and a distance between the GPS satellite 8a and the pseudo satellite station 40a is R2, in this embodiment, R1≠R2. When the satellite signal processing apparatus 50 distributes the satellite signal received at the position of the antenna 10 as it is to the pseudo satellite station 40a without considering a difference in a distance between the antenna 10 and the pseudo satellite station 40a, and the satellite station 40*a* transmits a pseudo satellite signal, the pseudo satellite signal is equivalent to the "pseudo satellite signal transmitted from the antenna 10" when viewed from the positioning receiver 60. In this case, even if the satellite signal processing apparatus 50 distributes the pseudo satellite signals to each of the plurality of pseudo satellite stations for each PRN code, each of the pseudo satellite signals transmitted from the plurality of pseudo satellite stations is the "pseudo satellite signal transmitted from the antenna 10", and a result of a positioning calculation by the positioning receiver 60 using the pseudo satellite signal is only the position of the antenna 10.

Therefore, the satellite signal processing apparatus 50 needs to generate a pseudo satellite signal in consideration of a difference D in the distance between the antenna 10 and the pseudo satellite station 40*a*. In the embodiment, the difference D in the distance between the antenna 10 and the pseudo satellite station 40*a* is reflected in the pseudo satellite signal by adjusting a phase of the PRN code of the pseudo satellite signal generated by the satellite signal processing apparatus 50.

The position of the antenna 10 and the position of the pseudo satellite station 40*a* are known and the position of the antenna 10 is defined as (Xa, Ya, Za) and the position of the pseudo satellite station 40*a* is defined as (Xr, Yr, Zr). The position of the GPS satellite 8*a* at time t is referred to as (Xs, Ys, Zs). The position of the GPS satellite 8*a* can be determined based on the ephemeris or almanac included in the navigation data acquired by decoding the satellite signal, and a current time. Either the ephemeris or almanac may use one which is acquired as positioning assistance data obtained via a wired or wireless communication line, or may use satellite orbit information generated by the satellite signal processing apparatus 50.

The distance R1 between the GPS satellite 8*a* and the antenna 10 is obtained by the following equation (1), and the distance R2 between the GPS satellite 8*a* and the pseudo satellite station 40*a* is obtained by the following equation (2).

$$R1 = \sqrt{(X_s - X_a)^2 + (Y_s - Y_a)^2 + (Z_s - Z_a)^2} \quad (1)$$

$$R2 = \sqrt{(X_s - X_r)^2 + (Y_s - Y_r)^2 + (Z_s - Z_r)^2} \quad (2)$$

The delay time (delay amount) t(n) of the PRN code can obtain the difference D of the distance by the following equation (3) from the distance R1 between the GPS satellite 8*a* and the antenna 10 and the distance R2 between the GPS satellite 8*a* and the pseudo satellite station 40*a*. As illustrated in the following equation (4), it is also possible to determine the delay time (delay amount) t(n) of the PRN code by dividing the difference D of the distance by a light speed c.

$$D = R2 - R1 \quad (3)$$

$$t(n) = D/c \text{ (c is the light speed)} \quad (4)$$

Thus, the pseudo station control device 30 transmits the pseudo satellite signals generated based on the delay time t(n) for an actual satellite signals from the pseudo satellite stations 40*a*, 40*b*, and 40*c*, respectively. Thus, an error of the positions at which the pseudo satellite stations 40*a*, 40*b*, and 40*c* are disposed can be corrected and more accurate positioning can be performed indoors by transmitting the pseudo satellite signal generated based on the delay time t(n) for the actual satellite signals from each of the pseudo satellite stations 40*a*, 40*b*, and 40*c*.

Returning to FIGS. 1 and 2, the pseudo satellite signal generation section 34 uses the corresponding PRN codes (PRN5, PRN2, and PRN7) and the delay time to generate the pseudo satellite signal to be transmitted to each of the pseudo satellite stations 40*a*, 40*b*, and 40*c*. The transmission section 35 transmits the generated pseudo satellite signal to each of the corresponding pseudo satellite stations 40*a*, 40*b*, and 40*c*.

The plurality of pseudo satellite stations 40*a*, 40*b*, and 40*c* illustrated in FIG. 1 receive the pseudo satellite signals transmitted from the transmission section 35 of the pseudo station control device 30 and transmit respective pseudo satellite signals. Specifically, in the embodiment, the pseudo satellite station 40*a* transmits the allocated PRN code (PRN5), that is, the pseudo satellite signal corresponding to the satellite signal of the GPS satellite 8*a*. The pseudo satellite station 40*b* transmits the allocated PRN code (PRN2), that is, the pseudo satellite signal corresponding to the satellite signal of the GPS satellite 8*c*. The pseudo satellite station 40*c* transmits the allocated PRN code (PRN7), that is, the pseudo satellite signal corresponding to the satellite signal of the GPS satellite 8*d*.

As described above, in the positioning system 100, the PRN codes (PRN5, PRN2, and PRN7) corresponding to the respective positioning satellites (GPS satellites 8*a*, 8*c*, and 8*d*) selected by the pseudo station control device 30 are al located to the respective pseudo satellite stations 40*a*, 40*b*, and 40*c* installed indoors one by one, and the delay times of the allocated PRN codes (PRN5, PRN2, and PRN7) are determined. The pseudo satellite signals generated by using the PRN codes (PRN5, PRN2, and PRN7) corresponding to the plurality of respective pseudo satellite stations 40*a*, 40*b*, and 40*c* and the delay times are transmitted from the pseudo satellite stations 40*a*, 40*b*, and 40*c* corresponding the respective positioning satellites (GPS satellites 8*a*, 8*c*, and 8*d*). Therefore, even if the positioning receiver (information processing apparatus) 60 such as a smartphone currently in circulation is used as it is, positioning can be performed indoors based on the satellite signals from the positioning satellites (GPS satellites 8*a*, 8*c*, and 8*d*) by applying the positioning system 100 of the embodiment.

2. Method of Controlling Pseudo Satellite Station

Figure 5:
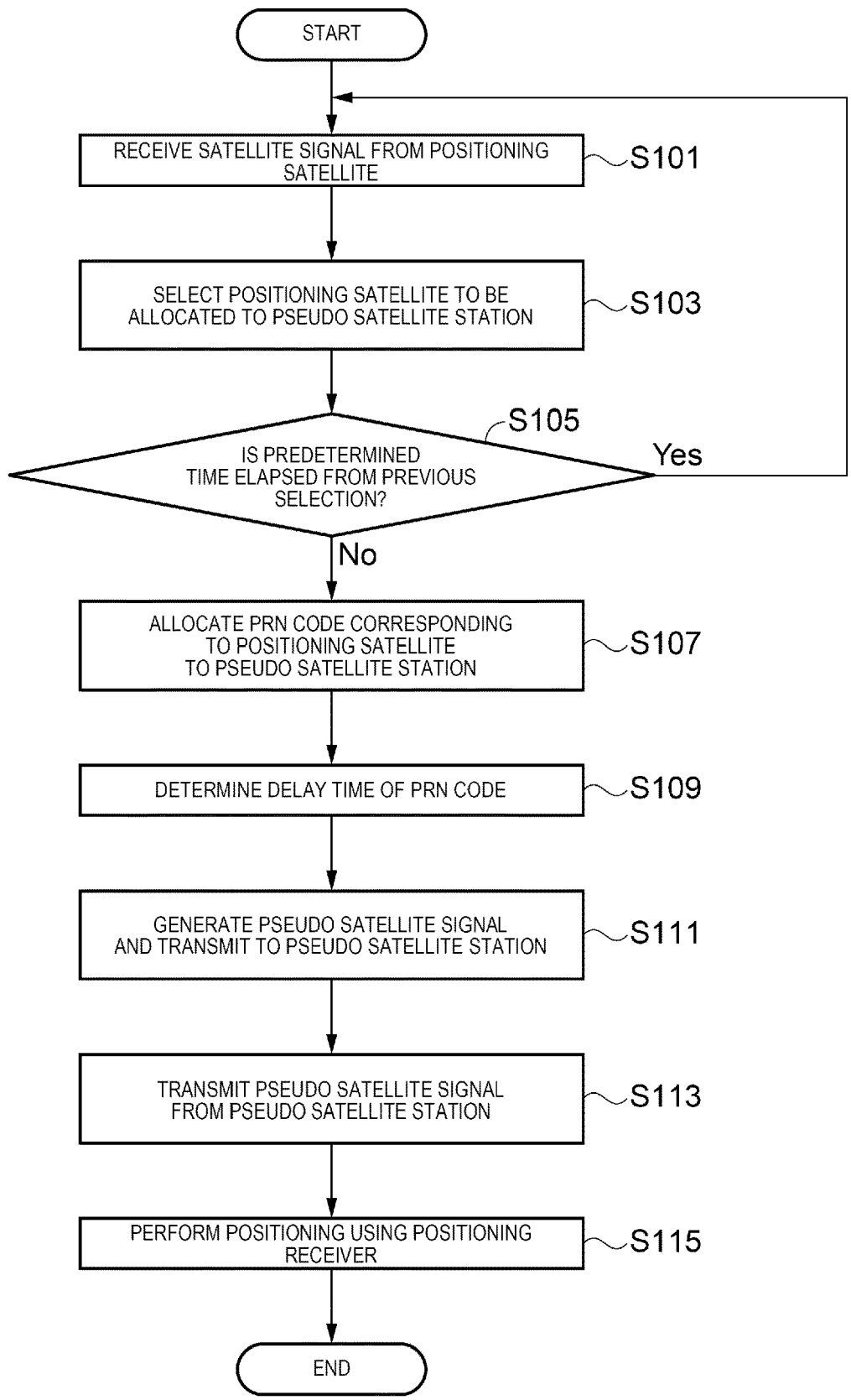
FIG. 5 is a flowchart illustrating a procedure of a method of controlling a pseudo satellite station in the positioning system.

Next, a procedure of a method of controlling the pseudo satellite stations 40*a*, 40*b*, and 40*c* in the positioning system 100 will be described with reference to FIG. 5. FIG. 5 is a flowchart illustrating the procedure of the method of controlling a pseudo satellite station in the positioning system. In addition, description will be given for the elements constituting the positioning system 100 using the same symbols.

As illustrated in FIG. 5, the method of controlling the pseudo satellite stations 40*a*, 40*b*, and 40*c* in the positioning system 100 includes step S101 of receiving the satellite signals from the positioning satellites, step S103 of selecting the positioning satellites to be allocated to the pseudo satellite stations, step S107 of allocating the PRN code corresponding to each of the selected positioning satellites to each of the plurality of pseudo satellite stations one by one, step S109 of determining the delay times of the PRN codes allocated to the plurality of pseudo satellite stations, step S111 of transmitting the PRN code corresponding to each of plurality of pseudo satellite stations and the pseudo satellite signal generated using the delay time to each of the plurality of pseudo satellite stations, and step S113 of transmitting the corresponding pseudo satellite signal from each of the plurality of pseudo satellite stations.

The method of controlling the pseudo satellite stations 40*a*, 40*b*, and 40*c* in the positioning system 100 can include a procedure of step S105, which is a step of determining whether or not a predetermined time is elapsed, between step S103 and step S107 described above. In addition, the method of controlling the pseudo satellite stations 40a, 40b, and 40c in the positioning system 100 can include a procedure of step S115 in which positioning is performed by the positioning receiver 60 after step S113 described above. In the following description, the procedure including steps S105 and S115 will be described.

First, the satellite signal receiver 20 of the satellite signal processing apparatus 50 receives the satellite signals from the GPS satellites 8a, 8b, 8c, 8d, and 8e via the antenna 10 (step S101).

Next, the pseudo station control device 30 of the satellite signal processing apparatus 50 selects the GPS satellites to be allocated to the plurality of pseudo satellite stations 40a, 40b, and 40c installed indoors based on the received satellite signals (step S103). The pseudo station control device 30 selects the GPS satellite 8a (PRN5), the GPS satellite 8c (PRN2), and the GPS satellite 8d (PRN 7) as the GPS satellites to be allocated. Specifically, the pseudo station control device 30 selects the GPS satellite 8a (PRN5) as the GPS satellite to be allocated to the pseudo satellite station 40a, selects the GPS satellite 8c (PRN2) as the GPS satellite to be allocated to the pseudo satellite station 40b, and selects the GPS satellite 8d (PRN7) as the GPS satellite to be allocated to the pseudo satellite station 40c.

Next, the pseudo station control device 30 of the satellite signal processing apparatus 50 determines whether or not a predetermined time set in advance is elapsed since the GPS satellites to be allocated to the pseudo satellite stations 40a, 40b, and 40c were selected at the previous time (step S105). Here, when the set predetermined time is elapsed (step S105: Yes), the procedure returns to step S101, and the selection of the GPS satellites to be allocated to the pseudo satellite stations 40a, 40b, and 40c is repeated. Moreover, when the set predetermined time has not elapsed (step S105: No), the procedure proceeds to the following step S107. In addition, when the set predetermined time has not elapsed (step S105: No), it also includes a case where this time is a first selection of the GPS satellite.

Next, the pseudo station control device 30 of the satellite signal processing apparatus 50 allocates the PRN code corresponding to each of the selected GPS satellite 8a, GPS satellite 8c, and GPS satellite 8d to each of the plurality of pseudo satellite stations 40a, 40b, and 40c one by one (step S107). Specifically, the pseudo station control device 30 allocates the PRN5 as the PRN code to the pseudo satellite station 40a, allocates the PRN 2 as the PRN code to the pseudo satellite station 40b, and allocates the PRN7 as the PRN code to the pseudo satellite station 40c.

Next, the pseudo station control device 30 of the satellite signal processing apparatus 50 determines the delay time of the PRN code allocated to each of the plurality of pseudo satellite stations 40a, 40b, and 40c (step S109). The method of calculating the delay time is the same as that in the description of the system configuration, and thus the description thereof is omitted here.

Next, the pseudo station control device 30 of the satellite signal processing apparatus 50 uses the PRN code and the delay time of the PRN code corresponding to each of the plurality of pseudo satellite stations 40a, 40b, and 40c to generate the pseudo satellite signal corresponding to each of the GPS satellites 8a, 8c, and 8d, and transmit the pseudo satellite signal to each of the corresponding pseudo satellite stations 40a, 40b, and 40c (step S111). Specifically, the pseudo satellite signal corresponding to the GPS satellite 8a is transmitted to the pseudo satellite station 40a, the pseudo satellite signal corresponding to the GPS satellite 8c is transmitted to the pseudo satellite station 40b, and the pseudo satellite signal corresponding to the GPS satellite 8d is transmitted to the pseudo satellite station 40c.

Each of the pseudo satellite stations 40a, 40b, and 40c transmits each of the received pseudo satellite signals (step S113). Then, the positioning receiver 60 receives the pseudo satellite signal transmitted from each of the pseudo satellite stations 40a, 40b, and 40c, and performs positioning based on the pseudo satellite signal (step S115).

Thus, a series of procedures of the method of controlling the pseudo satellite stations 40a, 40b, and 40c in the positioning system 100 is ended.

According to the method of controlling the pseudo satellite stations 40a, 40b, and 40c in the positioning system 100 described above, the PRN codes (PRN5, PRN2, and PRN7) corresponding to the respective positioning satellites (GPS satellites 8a, 8c, and 8d) selected by the pseudo station control device 30 of the satellite signal processing apparatus 50 are allocated to the respective pseudo satellite stations 40a, 40b, and 40c installed indoors one by one, and the delay times of the allocated PRN codes (PRN5, PRN2, and PRN7) are determined. The pseudo satellite signals generated by using the PRN codes (PRN5, PRN2, and PRN7) corresponding to the plurality of respective pseudo satellite stations 40a, 40b, and 40c and the delay times are transmitted from the pseudo satellite stations 40a, 40b, and 40c corresponding the respective positioning satellites (GPS satellites 8a, 8c, and 8d). Therefore, even if the positioning receiver (information processing apparatus) 60 such as a smartphone, tablet, or a wearable device currently in circulation is used as it is, positioning based on the satellite signals from positioning satellites (GPS satellites 8a, 8c, and 8d) can be performed indoors by applying the method of controlling the pseudo satellite stations 40a, 40b, and 40c as described above.

3. Method of Selecting Positioning Satellite

Figure 6:
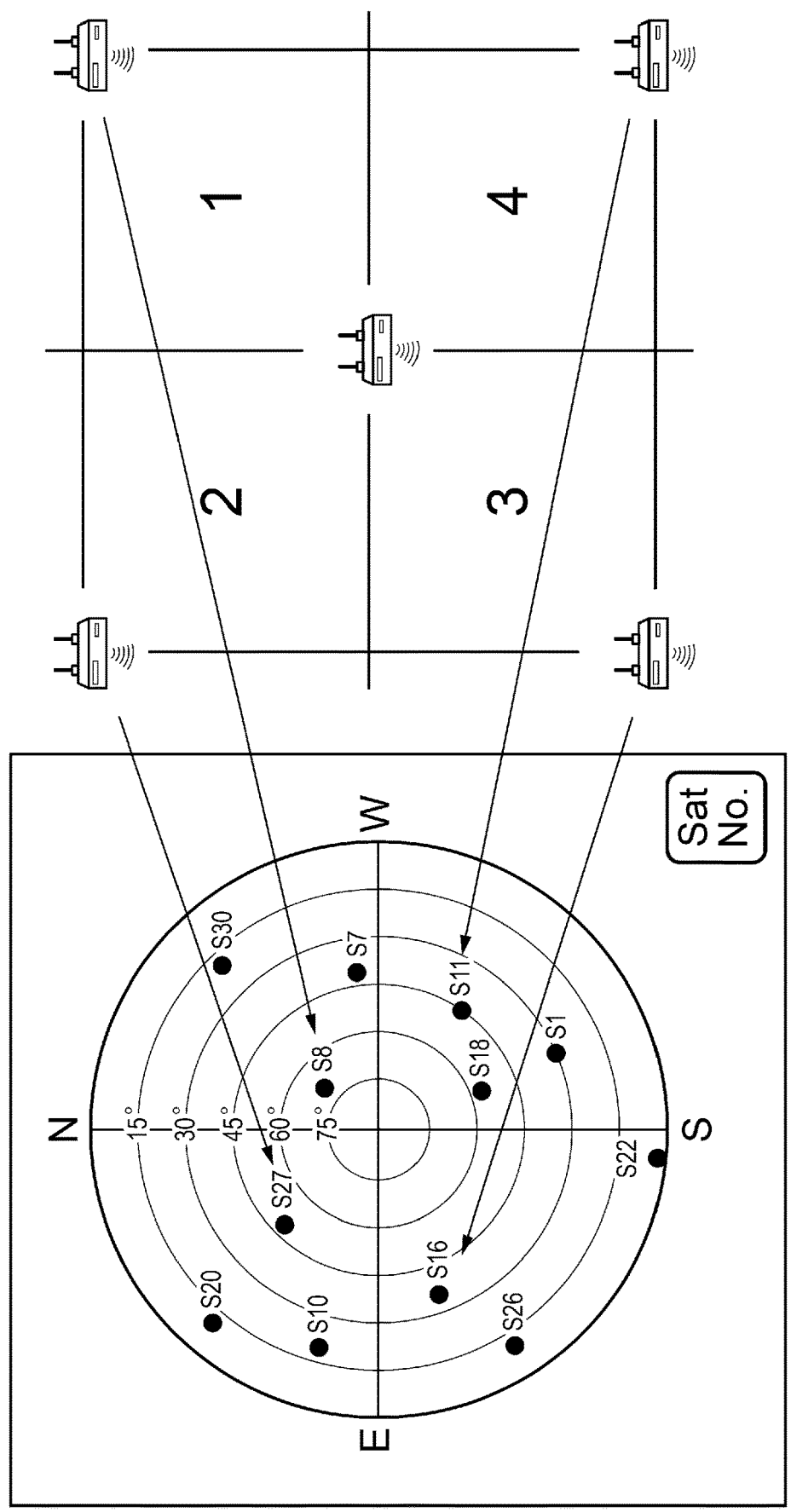
FIG. 6 is a schematic view illustrating an example of a method of selecting a positioning satellite from geometrically disposed positioning satellites.
Figure 7:
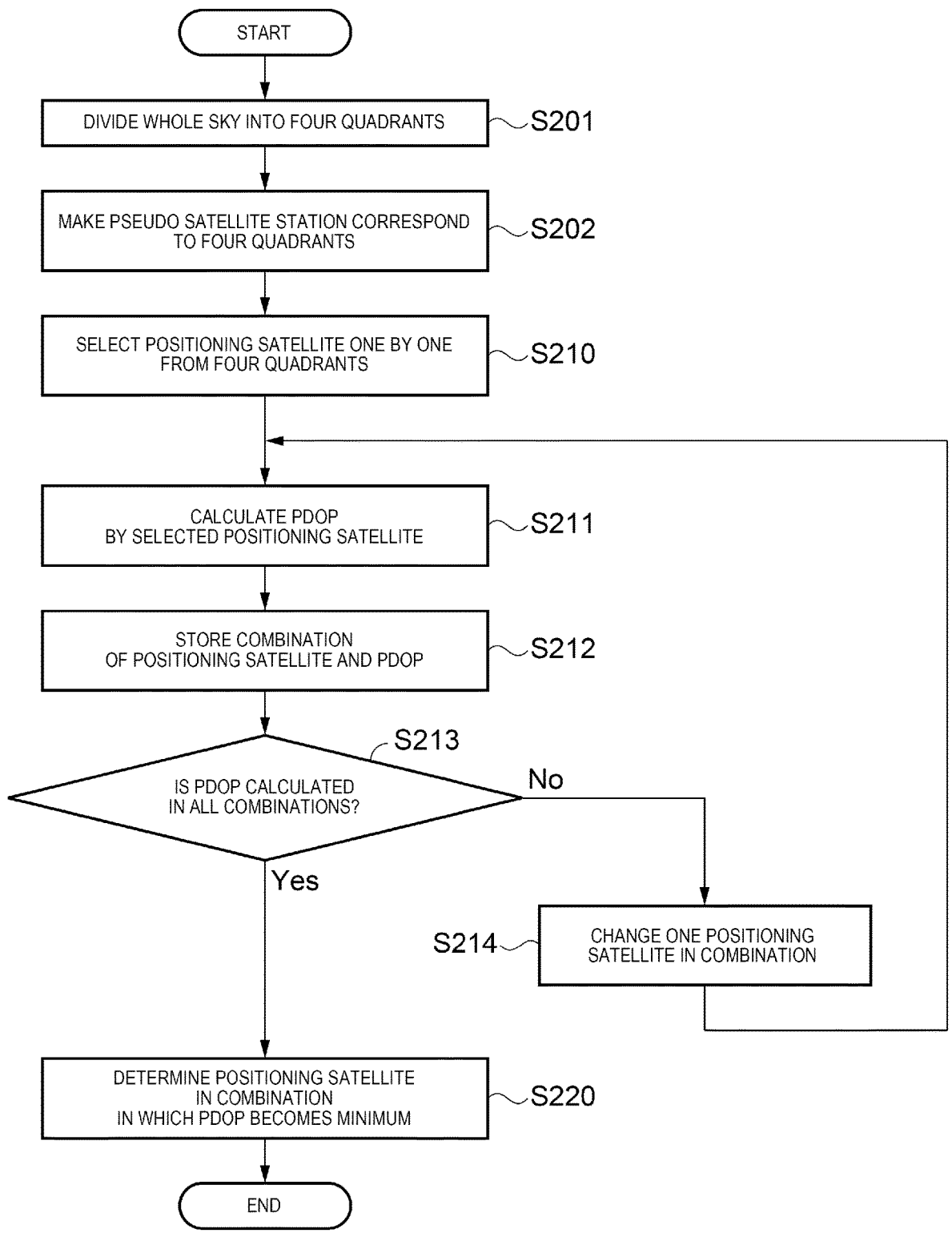
FIG. 7 is a flowchart illustrating an example of a procedure in the method of selecting a positioning satellite.

Next, a method of selecting based on the geometrical disposition of the plurality of positioning satellites (GPS satellites) will be described with reference to FIGS. 6 and 7, as an example of a method of selecting the positioning satellites to be allocated to pseudo satellites. The method of selecting the positioning satellites can be paraphrased as the method of selecting the PRN codes. FIG. 6 is a schematic view illustrating an example of the method of selecting the positioning satellite from geometrically disposed positioning satellites. FIG. 7 is a flowchart illustrating an example of a procedure in the method of selecting the positioning satellite. Further, in the following description, a procedure of the method of selecting the positioning satellites to be allocated to the pseudo satellite stations will be described along the flowchart of FIG. 7 and with reference to FIG. 6.

In the method of selecting the positioning satellites (GPS satellites), as illustrated in FIGS. 6 and 7, whole sky in which the plurality of positioning satellites (GPS satellites) are disposed is divided into four quadrants (whole sky quadrant) by a line connecting east (E) and west (W) and a line connecting south (S) and north (N) (step S201). At the same time, the disposition of the plurality of pseudo satellite stations is divided into four quadrants (pseudo satellite quadrants), and each of the pseudo satellite quadrants is made to correspond to each of whole sky quadrants (step S202). In step S202, the pseudo satellite station is allocated to each of four quadrants (pseudo satellite quadrants) one by one. One pseudo satellite station may be allocated in the middle of the four quadrants (pseudo satellite quadrants) and five pseudo satellite stations may be allocated. Here, the middle may be a center of a space or an area where the plurality of pseudo satellite stations are disposed, and means a state of being disposed inside an outer edge of the space or the area thereof. Further, the space in which the plurality of pseudo satellite stations are disposed is a space or an area in which pseudo satellite signals transmitted by the pseudo satellite stations can be received.

Next, the positioning satellite is selected one by one from each quadrant of the whole sky quadrant corresponding to each of the pseudo satellite quadrants (first quadrant to fourth quadrant) (step S210). In step S210, as the method of selecting positioning satellites, for example, the highest altitude positioning satellite (GPS satellite) can be selected among the quadrants (first quadrant to fourth quadrant) of the whole sky quadrant.

Specifically, in this example, a GPS satellite S8 is selected as the positioning satellite (GPS satellite) allocated to the first quadrant of the pseudo satellite quadrant, a GPS satellite S27 is selected as the positioning satellite (GPS satellite) allocated to the second quadrant of the pseudo satellite quadrant, a GPS satellite S16 is selected as the positioning satellite (GPS satellite) allocated to the third quadrant of the pseudo satellite quadrant, and a GPS satellite S18 is selected as the positioning satellite (GPS satellite) to be allocated to the fourth quadrant of the pseudo satellite quadrant.

Next, the GPS satellite S8 of the first quadrant, the GPS satellite S27 of the second quadrant, the GPS satellite S16 of the third quadrant, and the GPS satellite S18 of the fourth quadrant, which are the four selected positioning satellites, are combined to calculate a position accuracy reduction rate (PDOP: position dilution of precision) of the positioning satellite (GPS satellite) (step S211). Then, the combination of the positioning satellites and the position accuracy reduction rate (PDOP) are stored (step S212).

Next, in the combination of positioning satellites to be allocated to each quadrant, it is determined whether or not the PDOP has been calculated for all combinations (step S213). In the determination in step S213, if the PDOP of all combinations is not calculated (step S213: No), one positioning satellite of the combination is changed (step S214), and the procedure returns to step S211.

In step S214, the combination of positioning satellites used in step S211 is changed. In step S214, for example, a GPS satellite S7, which is the second highest positioning satellite in the first quadrant of the whole sky quadrant, is selected, and a second combination of the positioning satellites of the GPS satellite S7, the GPS satellite S27, the GPS satellite S16, and the GPS satellite S18 is provided.

Hereinafter, a specific procedure when step S214 is performed in the next cycle will be illustrated.

In the next cycle, for example, a GPS satellite S10, which is the second highest positioning satellite in the second quadrant of the whole sky quadrant, is selected, and a third combination of the positioning satellites of the GPS satellite S8, the GPS satellite S10, the GPS satellite S16, and the GPS satellite S18 is provided.

When step S214 is executed in the next cycle, for example, a GPS satellite S26, which is the second highest positioning satellite in the second quadrant of the whole sky quadrant, is selected, and a fourth combination of the positioning satellites of the GPS satellite S8, the GPS satellite S10, the GPS satellite S26, and the GPS satellite S18 is provided.

In the next cycle, for example, a GPS satellite S11, which is the second highest positioning satellite in the fourth quadrant of the whole sky quadrant, is selected, and a fifth combination of the GPS satellite S8, the GPS satellite S10, the GPS satellite S16, and the GPS satellite S11 is provided.

Also, in the next cycle, one positioning satellite is changed from the second combination of positioning satellites of the GPS satellite S7, the GPS satellite S27, the GPS satellite S16, and the GPS satellite S18. For example, the GPS satellite S10, which is the second highest positioning satellite in the second quadrant of the whole sky quadrant, is selected, and a sixth combination of the positioning satellites of the GPS satellite S7, the GPS satellite S10, the GPS satellite S16, and GPS satellite S18 is provided.

From then on, such combination changes will be made sequentially. However, the execution order of the combinations is not limited to the above, and may be in any order.

In the determination in step S213, if the PDOP of all combinations of positioning satellites is calculated (step S213: Yes), a combination that minimizes the PDOP is determined (step S220). Then, positioning satellites in each quadrant of the determined combination are selected as positioning satellites (GPS satellites) to be allocated to each quadrant of the pseudo satellite quadrant, and a series of procedures relating to the method of selecting positioning satellites (GPS satellites) is ended.

According to the procedure described above, it is possible to select positioning satellites (GPS satellites) to be allocated to five pseudo satellite stations based on the disposition (geometrical disposition) of the plurality of positioning satellites (GPS satellites). In other words, the PRN codes to be allocated to five pseudo satellite stations can be determined based on the disposition (geometrical disposition) of the plurality of positioning satellites (GPS satellites).

In step S202, when one pseudo satellite station is allocated in the middle of four quadrants (pseudo satellite quadrants) to form five pseudo satellite stations, if the positioning satellite (GPS satellite) allocated to the pseudo satellite station in the middle of the pseudo satellite quadrant is selected, the GPS satellite S8, which is the positioning satellite closest to a zenith among the positioning satellites (GPS satellites) disposed on the whole sky, can be allocated to the middle of the pseudo satellite stations. The positioning satellite (GPS satellite S8) selected here is excluded from the options in the procedure after step S210.

In the embodiment described above, the GPS using the GPS satellites 8a, 8b, 8c, 8d, and 8e is described as an example of the position information satellites provided in the global navigation satellite system (GNSS). The global navigation satellite system may include other systems such as Galileo (EU), GLONASS (Russia), Hokuto (China), and position information satellites that transmit satellite signals such as geostationary satellites such as SBAS and quasi-zenith satellites. That is, the positioning system 100 may be configured to acquire any one of date information, time information, position information, and speed information obtained by processing radio waves (radio signals) from position information satellites including satellites other than the GPS satellites 8a, 8b, 8c, 8d, and 8e. The global navigation satellite system can be a regional navigation satellite system (RNSS).

Further, in the embodiment described above, switching (updating) timing of the allocated PRN code is described by the method of "updating the PRN code when a predetermined time is elapsed", but the present disclosure is not limited thereto. For example, the allocated PRN code may be updated at timing exemplified below, and the same effect as that of the embodiment described above can be obtained.

1) When a visible satellite (positioning satellite where the antenna 10 can receive the satellite signal) changes.

2) Predetermined switching timing (switching interval is not determined, and a time interval may be disjointed).

Further, in the embodiment described above, the delay time t(n) of the PRN code is determined focusing on the difference D in the distance between the antenna 10 and the pseudo satellite station 40a, but the present disclosure is not limited thereto. The delay time t(n) of the PRN code can be determined in consideration of the processing delay time until the satellite signal is received by the antenna 10 and the pseudo satellite signal is transmitted from the pseudo satellite station 40a. The processing delay time at this time may be a predetermined value or may be calculated based on the difference between the reception time at the antenna 10 and the time at which the satellite signal processing apparatus transmits the pseudo satellite signal to the pseudo satellite station 40a. Alternatively, a transmission delay (known) from the satellite signal processing apparatus 50 to the pseudo satellite station 40a may be taken into consideration. Even with such a method, the same effect as that of the embodiment described above can be obtained.

The functions of the satellite signal processing apparatus 50 in the embodiment described above may be functionally shared by the satellite signal processing apparatus 50 and the pseudo satellite station 40 as follows. The satellite signal processing apparatus 50 allocates the PRN code to the pseudo satellite stations 40a, 40b, and 40c, and the navigation data of the positioning satellite corresponding to the PRN code and the reception time when the satellite signal is received by the antenna 10 are transmitted to the pseudo satellite stations 40a, 40b, and 40c. Then, the pseudo satellite stations 40a, 40b, and 40c may calculate the delay time t(n), adjust the phase of the PRN code, superimpose the adjusted PRN code on the navigation data, generate the pseudo satellite signal, and transmit the pseudo satellite signal. As described above, the satellite signal processing apparatus 50 and the pseudo satellite station 40 share the functions, and the pseudo satellite stations 40a, 40b, and 40c calculate the delay amount, so that the delay amount can be determined more accurately.

In the above description, as the method of selecting positioning satellites to be allocated to pseudo satellite stations, it is determined whether or not to select the positioning satellite by the comparison between the position accuracy reduction rate (PDOP) of the firstly selected positioning satellites and the position accuracy reduction rate (PDOP) when one of the positioning satellites is reselected, but the present disclosure is not limited thereto. As another method of selecting the positioning satellites to be allocated to the pseudo satellite stations, for example, a threshold of the PDOP is set in advance, and the positioning satellites to be allocated to each of the pseudo satellite stations may be selected depending on whether or not the PDOP is below the threshold. In this way, it is possible to reduce a search flow (number of searches) until the combination of positioning satellites that minimize the PDOP is determined, and to select the positioning satellites more efficiently.

Below, the contents derived from the embodiment described above will be described as each aspect.

[Aspect 1] A positioning system of the aspect includes: a satellite signal receiver that receives satellite signals from a plurality of positioning satellites; a plurality of indoor pseudo satellite stations that transmit pseudo satellite signals; and a pseudo station control device that selects the positioning satellite to be allocated to each of the plurality of pseudo satellite stations based on the received satellite signals, allocates a PRN code corresponding to each of the selected positioning satellites to each of the plurality of pseudo satellite stations one by one, determines a delay time of the PRN code allocated to the plurality of pseudo satellite stations, and transmits a plurality of pseudo satellite signals generated using the PRN code corresponding to each of the plurality of pseudo satellite stations and the delay time to each of the plurality of pseudo satellite stations.

According to the aspect, the pseudo station control device of the positioning system allocates the PRN code corresponding to each of the selected positioning satellites to each of the indoor pseudo satellite stations one by one, and determines the delay time of the allocated PRN code. Then, since the pseudo satellite signal generated using the PRN code corresponding to each of the plurality of pseudo satellite stations and the delay time is transmitted from the pseudo satellite station, the positioning receiver currently in circulation is used as it is, and positioning can be performed indoors.

[Aspect 2] In the positioning system of the aspect, the pseudo station control device may determine the PRN code to be allocated to the pseudo satellite station based on a disposition of the plurality of positioning satellites.

According to the aspect, it is possible to determine a combination of the positioning satellites for obtaining positioning calculation results with higher accuracy.

[Aspect 3] In the positioning system of the aspect, when a predetermined time is elapsed, the pseudo station control device may update the PRN code allocated to the pseudo satellite station.

According to the aspect, since the PRN code allocated to the pseudo satellite station is updated when the predetermined time is elapsed, a satellite is always selected at a position suitable for receiving the satellite signal, and the pseudo satellite signal corresponding to the selected satellite signal can be received.

[Aspect 4] In the positioning system of the aspect, the pseudo station control device may transmit the pseudo satellite signal generated based on the delay time for the satellite signal received by the satellite signal receiver to the pseudo satellite station.

According to the aspect, the pseudo satellite signal processed based on the delay time for the actual satellite signal received by the satellite signal receiver is transmitted from the pseudo satellite station, so that an error in the position where the pseudo satellite station is disposed can be corrected and more accurate positioning can be performed indoors.

[Aspect 5] A pseudo station control device for controlling a plurality of indoor pseudo satellite stations that transmit pseudo satellite signals of the aspect, the device includes: a satellite selection section that selects positioning satellites to be allocated to the plurality of pseudo satellite stations based on satellite signals from a plurality of the positioning satellites; a PRN code imparting section that allocates a PRN code corresponding to each of the selected positioning satellites to each of the plurality of pseudo satellite stations one by one; a delay amount calculation section that determines a delay time of each of the PRN codes allocated to the plurality of pseudo satellite stations; a pseudo satellite signal generation section that generates the pseudo satellite signal using the PRN code and the corresponding delay time; and a transmission section that transmits the pseudo satellite signal to each of the plurality of corresponding pseudo satellite stations.

According to the aspect, the pseudo station control device selects the positioning satellite for receiving the satellite signal from the plurality of positioning satellites, and allocates the PRN code corresponding to each of the selected positioning satellites to each of the pseudo satellite stations installed indoors one by one. Then, the delay amount of the satellite signal corresponding to the positioning satellite, in which the PRN code is allocated, is determined, and the pseudo satellite signal processed including the delay amount is calculated and transmitted to the pseudo satellite station. Since the pseudo satellite station transmits the pseudo satellite signal, it is possible perform indoor positioning using the positioning receiver currently in circulation as it is.

[Aspect 6] In the pseudo station control device of the aspect, the PRN code imparting section may allocate the PRN code to the pseudo satellite station based on a disposition of the plurality of positioning satellites.

According to the aspect, it is possible to determine a combination of positioning satellites for obtaining positioning calculation results with higher accuracy, and allocate the PRN code to the pseudo satellite station.

[Aspect 7] In the pseudo station control device of the aspect, when a predetermined time is elapsed, the PRN code imparting section may update the PRN code allocated to the pseudo satellite station.

According to the aspect, since the PRN code allocated to the pseudo satellite station is updated when the predetermined time is elapsed, a satellite is always selected at a position suitable for receiving the satellite signal, and the satellite signal can be received.

[Aspect 8] In the pseudo station control device of the aspect, the pseudo satellite signal generation section may calculate the pseudo satellite signal processed based on the delay time for the satellite signal from the positioning satellite.

According to the aspect, an error in the position where the pseudo satellite stations are disposed can be corrected and more accurate positioning can be performed indoors by calculating the pseudo satellite signal processed based on the delay time.

[Aspect 9] A method of controlling a pseudo satellite station of the aspect, the method includes: receiving satellite signals from a plurality of positioning satellites; selecting the positioning satellites to be allocated to a plurality of indoor pseudo satellite stations based on the received satellite signals; allocating a PRN code corresponding to each of the selected positioning satellites to each of the plurality of pseudo satellite stations one by one; determining a delay time of the PRN code allocated to the plurality of pseudo satellite stations; transmitting the pseudo satellite signal generated using the PRN code and the delay time to each of the plurality of pseudo satellite stations; and transmitting the corresponding pseudo satellite signal from each of the plurality of pseudo satellite stations.

According to the aspect, the method of controlling the pseudo satellite station is provided to allocate the PRN code corresponding to each of the positioning satellites determined to be received to each of the pseudo satellite stations installed indoors one by one. Then, since the delay amount of the satellite signal corresponding to the positioning satellite in which the PRN code is allocated is determined, the pseudo satellite signal which is processed including the delay amount is calculated, and the pseudo satellite signal is transmitted from the pseudo satellite station, the positioning receiver currently in circulation is used as it is, and positioning can be performed indoors.

[Aspect 10] In the method of controlling a pseudo satellite station of the aspect, in the selecting, the positioning satellites to be allocated to the plurality of pseudo satellite stations may be selected based on a disposition of the plurality of positioning satellites.

According to the aspect, it is possible to determine the positioning satellite that receives the satellite signal and the PRN code allocated to the pseudo satellite station by a simple method.

[Aspect 11] In the method of controlling a pseudo satellite station of the aspect, the PRN code may be updated when a predetermined time is elapsed after the PRN code is allocated to the plurality of pseudo satellite stations.

According to the aspect, since the PRN code allocated to the pseudo satellite station is updated when the predetermined time is elapsed, a satellite is always selected at a position suitable for receiving the satellite signal, and the pseudo satellite signal corresponding to the selected satellite signal can be received.

[Aspect 12] In the method of controlling a pseudo satellite station, in the transmitting of the pseudo satellite signal, the pseudo satellite signal generated based on the delay time for the satellite signal received by a satellite signal receiver may be transmitted to the pseudo satellite station.

According to the aspect, the pseudo satellite signal processed based on the delay time for the actual satellite signal received by the satellite signal receiver is transmitted from the pseudo satellite station, so that an error in the position where the pseudo satellite station is disposed can be corrected and more accurate positioning can be performed indoors.

What is claimed is:

1. A positioning system comprising:
    a satellite signal receiver that receives satellite signals from a plurality of positioning satellites;
    a plurality of indoor pseudo satellite stations that transmit pseudo satellite signals; and
    a pseudo station control device that selects the positioning satellite to be allocated to each of the plurality of pseudo satellite stations based on the received satellite signals, allocates a PRN code corresponding to each of the selected positioning satellites to each of the plurality of pseudo satellite stations one by one, determines a delay time of the PRN code allocated to the plurality of pseudo satellite stations, and transmits a plurality of pseudo satellite signals generated using the PRN code corresponding to each of the plurality of pseudo satellite stations and the delay time to each of the plurality of pseudo satellite stations, wherein
    the pseudo station control device determines the PRN code to be allocated to the pseudo satellite station based on a disposition of the plurality of positioning satellites.

2. The positioning system according to claim 1, wherein when a predetermined time is elapsed, the pseudo station control device updates the PRN code allocated to the pseudo satellite station.

3. The positioning system according to claim 1, wherein the pseudo station control device transmits the pseudo satellite signal generated based on the delay time for the satellite signal received by the satellite signal receiver to the pseudo satellite station.

4. A pseudo station control device for controlling a plurality of indoor pseudo satellite stations that transmit pseudo satellite signals, the device comprising:
    a satellite selection section that selects positioning satellites to be allocated to the plurality of pseudo satellite stations based on satellite signals from a plurality of the positioning satellites;
    a PRN code imparting section that allocates a PRN code corresponding to each of the selected positioning satellites to each of the plurality of pseudo satellite stations one by one;

a delay amount calculation section that determines a delay time of each of the PRN codes allocated to the plurality of pseudo satellite stations;

a pseudo satellite signal generation section that generates the pseudo satellite signal using the PRN code and the corresponding delay time; and a transmission section that transmits the pseudo satellite signal to each of the plurality of corresponding pseudo satellite stations.

5. The pseudo station control device according to claim 4, wherein the PRN code imparting section allocates the PRN code to the pseudo satellite station based on a disposition of the plurality of positioning satellites.

6. The pseudo station control device according to claim 4, wherein when a predetermined time is elapsed, the PRN code imparting section updates the PRN code allocated to the pseudo satellite station.

7. The pseudo station control device according to claim 4, wherein the pseudo satellite signal generation section calculates the pseudo satellite signal processed based on the delay time for the satellite signal from the positioning satellite.

8. A method of controlling a pseudo satellite station comprising:

receiving satellite signals from a plurality of positioning satellites;

selecting the positioning satellites to be allocated to a plurality of indoor pseudo satellite stations based on the received satellite signals;

allocating a PRN code corresponding to each of the selected positioning satellites to each of the plurality of pseudo satellite stations one by one;

determining a delay time of the PRN code allocated to the plurality of pseudo satellite stations;

transmitting the pseudo satellite signal generated using the PRN code and the delay time to each of the plurality of pseudo satellite stations; and transmitting the corresponding pseudo satellite signal from each of the plurality of pseudo satellite stations, wherein in the selecting, the positioning satellites to be allocated to the plurality of pseudo satellite stations are selected based on a disposition of the plurality of positioning satellites.

9. The method of controlling a pseudo satellite station according to claim 8, wherein the PRN code is updated when a predetermined time is elapsed after the PRN code is allocated to the plurality of pseudo satellite stations.

10. The method of controlling a pseudo satellite station according to claim 8, wherein in the transmitting of the pseudo satellite signal, the pseudo satellite signal generated based on the delay time for the satellite signal received by a satellite signal receiver is transmitted to the pseudo satellite station.

* * * * *